No. 648,924. Patented May 8, 1900.
C. H. CHARLSON.
RIDING ATTACHMENT FOR HARROWS.
(Application filed Oct. 16, 1899.)
(No Model.) 2 Sheets—Sheet 1.

No. 648,924. Patented May 8, 1900.
C. H. CHARLSON.
RIDING ATTACHMENT FOR HARROWS.
(Application filed Oct. 16, 1899.)

(No Model.) 2 Sheets—Sheet 2.

Witnesses.
Harry Kilgore,
F. D. Merchant

Inventor.
Charlie H. Charlson
By his Attorney,
Jas. F. Williamson

UNITED STATES PATENT OFFICE.

CHARLIE H. CHARLSON, OF RUTHVEN, IOWA.

RIDING ATTACHMENT FOR HARROWS.

SPECIFICATION forming part of Letters Patent No. 648,924, dated May 8, 1900.

Application filed October 16, 1899. Serial No. 733,724. (No model.)

*To all whom it may concern:*

Be it known that I, CHARLIE H. CHARLSON, a citizen of the United States, residing at Ruthven, in the county of Palo Alto and State of Iowa, have invented certain new and useful Improvements in Riding Attachments for Harrows; and I do hereby declare the following to be a full, clear, and exact description of the invention, such as will enable others skilled in the art to which it appertains to make and use the same.

My invention has for its object to provide an improved riding attachment for harrows; and to this end it consists of the novel devices and combinations of devices hereinafter described, and defined in the claim.

My invention is illustrated in the accompanying drawings, wherein like characters indicate like parts throughout the several views.

Figure 1:
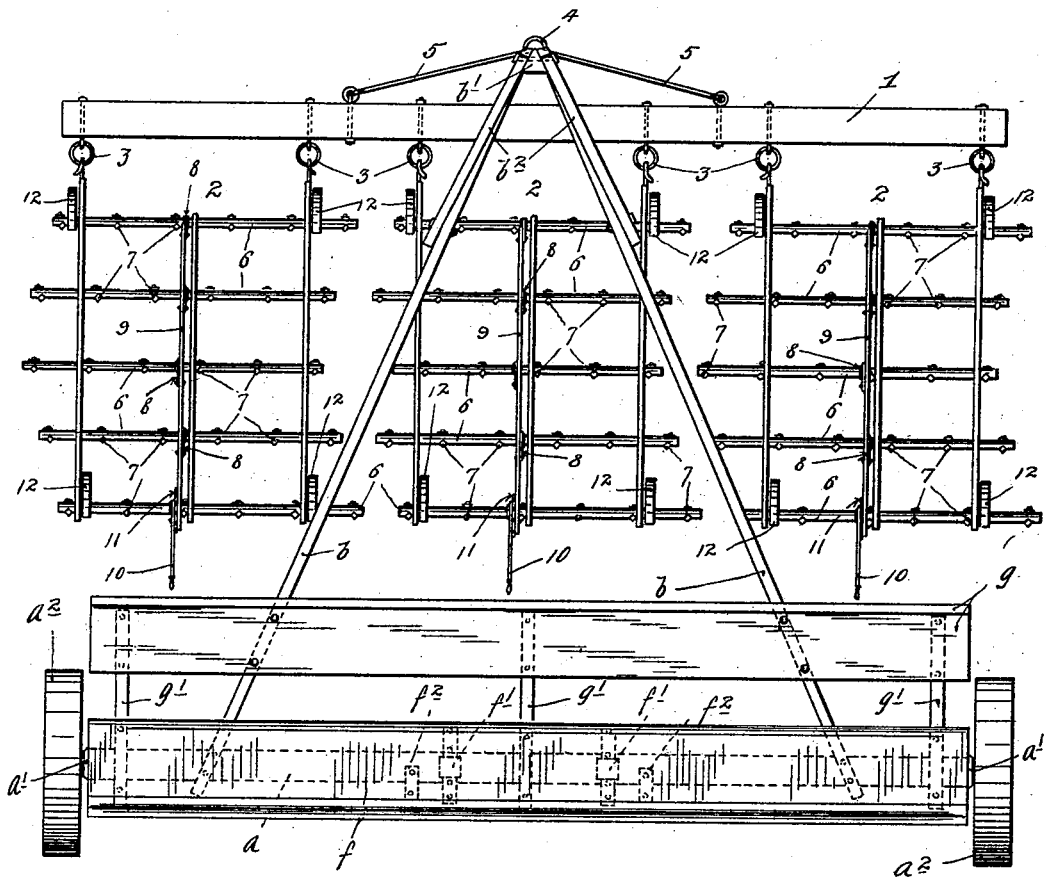
Figure 2:
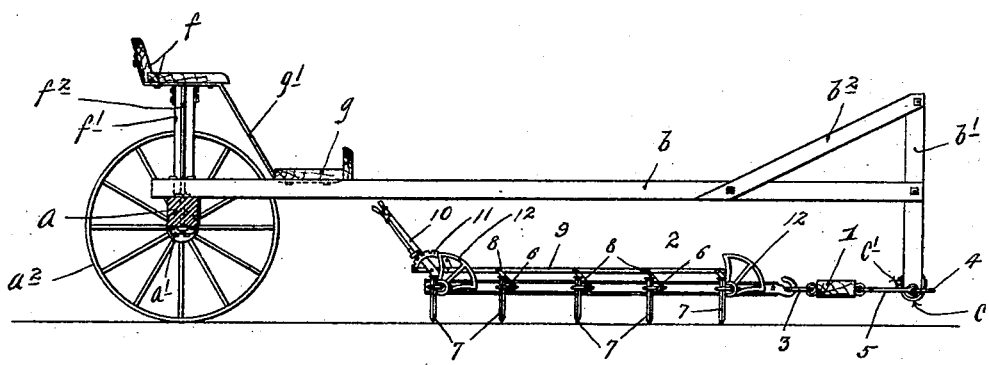
Figure 3:
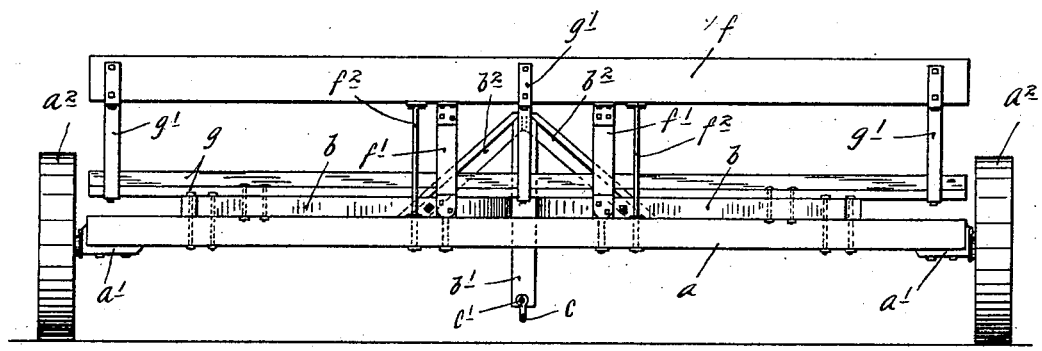
Figure 4:
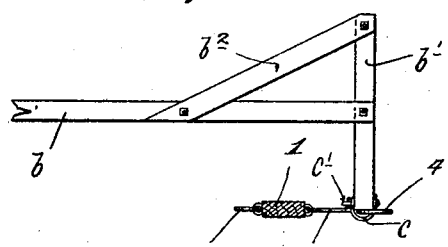

Figure 1 is a plan view showing a harrow with my improved riding attachment applied thereto. Fig. 2 is a view in right side elevation, but with one wheel removed, showing the harrow and riding attachment. Fig. 3 is a rear elevation of the riding attachment, and Fig. 4 is a detail view showing the forward portion of the frame of the riding attachment and the large evener-beam of the harrow connected thereto.

An ordinary harrow is illustrated, and of the parts of the same the numeral 1 indicates the large evener-beam, to which a plurality—as shown, three—of harrow-sections 2 are connected by links or rings 3. The evener 1 is drawn by a suitable draft-rigging, (not shown,) which would be connected to a large ring 4, which in turn is connected to said evener by a pair of draft-rods 5.

Each section 2 of the harrow illustrated has a plurality of transverse rock-shafts 6, that carry harrow-teeth 7. Each rock-shaft 6 has a crank-arm 8, and all of the crank-arms 8 of a given section 2 are connected to a common bar 9, which in turn is connected to an operating-lever 10, arranged to coöperate with a latch-lever 11 on the frame of said section 2. The front and rear shafts 6 of each section 2 are provided at their ends with segmental runners 12, which are turned upward when the harrow-teeth are turned downward, and vice versa. So much is ordinary construction, and the operation and use of same are well understood.

My improved riding attachment will now be described. As illustrated in the drawings, it comprises a long axle-beam $a$, provided at its ends with stub-axles $a'$, on which the truck-wheels $a^2$ are mounted to run. The axle $a$ $a'$ extends nearly or quite the distance of the transverse dimension of the harrow, and the wheels $a^2$ are preferably provided with wide faces to better adapt them to run over soft ground. The truck thus formed is mounted to run just to the rear of the harrow-sections 2, and it is drawn by a V-shaped horizontally-extended bracket $b$, the diverging prongs of which are rigidly secured to the axle-beam $a$ and the apex of which is connected to a vertical leg or post $b'$, the upper end of which is braced from the sides of said bracket $b$ by inclined bars $b^2$. The lower end of the leg or post $b'$ depends below the frame $b$ and at this lower end is provided with suitable means for attaching it to the large ring or link 4, heretofore noted, the particular means in this instance being a clevis $c$ and pin or bolt $c'$. In this manner the truck is caused to follow the harrow, but has an independent lateral movement with respect thereto.

The truck is provided with a wide seat $f$ and a wide footboard $g$, both of which extend nearly or quite the entire distance between the truck-wheels $a^2$, or at least far enough to enable the operator sitting upon said seat or standing upon said foot board or rest to reach any and all of the harrow-levers 10. The seat $f$ is supported from the axle $a$ in the vicinity of its center by means of vertical posts $f'$ and bolts or rods $f^2$. The foot board or rest $g$ is supported from the seat $f$ by inclined straps or braces $g'$.

When the harrow-teeth 7 are turned downward or into operative positions, the upper ends of the operating-levers 10 stand close to the foot board or rest $g$ and within reach of the operator. To throw the levers 10 forward to thereby throw downward the runners 12 and the harrow-teeth 7 upward and into operative positions, the operator may lean forward while standing on the foot board or rest.

By my improved riding attachment above described the operator riding thereon is enabled to readily control the operations of the various harrow-sections as may be necessary from time to time to remove cornstalks, weeds, &c., from the harrow-teeth, this, as is well understood, being accomplished by rocking the harrow-teeth 7 by means of the levers 10. The transverse length of the seat $f$ and foot-rest $g$ permit the operator to shift from one side to the other of the machine after turning the machine for travel in a reverse direction, thereby enabling him to keep out of the dust and to occupy a position where he can see the dragging edge or line which should be followed. With the construction above described the movements of the operator from one side to the other of the riding attachment will not prevent the said attachment from properly following the harrow.

It will be understood that the attachment above described may be considerably modified within the scope of my invention and that the attachment may be applied to harrows, drags, &c., of various constructions and designs.

What I claim, and desire to secure by Letters Patent of the United States, is as follows:

The combination with a harrow, made up of sections, each section having an operating-lever, of a riding attachment connected to move with said harrow, said riding attachment comprising a two-wheeled truck, the draft-bracket $b$ secured thereto and provided at its forward end with the braced vertical leg or post $b'$, the transversely-extended seat $f$, and the transversely-extended foot board or rest $g$, said parts $f$ and $g$ being supported from said truck and extended transversely in the rear of all of said operating-levers, substantially as described.

In testimony whereof I affix my signature in presence of two witnesses.

CHARLIE H. CHARLSON.

Witnesses:
C. O. WILLIAMSON,
J. H. ANDERSON.